(12) United States Patent
Kasuya et al.

(10) Patent No.: US 7,537,626 B2
(45) Date of Patent: May 26, 2009

(54) GAS-LIQUID SEPARATOR FOR A FUEL CELL SYSTEM ONBOARD A VEHICLE

(75) Inventors: Kuri Kasuya, Saitama (JP); Osamu Ichikawa, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 198 days.

(21) Appl. No.: 11/251,172

(22) Filed: Oct. 14, 2005

(65) Prior Publication Data

US 2006/0086074 A1    Apr. 27, 2006

(30) Foreign Application Priority Data

Oct. 22, 2004    (JP) .............................. 2004-308063

(51) Int. Cl.
 *B01D 45/00* (2006.01)
 *B01D 50/00* (2006.01)
 *F02B 25/06* (2006.01)
 *B01J 7/00* (2006.01)

(52) U.S. Cl. .......................... 55/434; 55/337; 123/572; 48/61

(58) Field of Classification Search .................. 55/337, 55/434; 48/61; 123/572
See application file for complete search history.

(56) References Cited

U.S. PATENT DOCUMENTS

| | | | | | |
|---|---|---|---|---|---|
| 13,743 | A | * | 11/1855 | Bakewell | 110/306 |
| 1,946,744 | A | * | 2/1934 | Jones et al. | 55/308 |
| 2,974,747 | A | * | 3/1961 | Coolidge et al. | 96/69 |
| 3,877,904 | A | * | 4/1975 | Lowrie | 96/189 |
| 4,056,371 | A | * | 11/1977 | Diemer, Jr. et al. | 95/216 |
| 5,000,768 | A | * | 3/1991 | Hwang | 55/308 |
| 5,021,070 | A | * | 6/1991 | Birbara et al. | 95/255 |
| 5,427,610 | A | * | 6/1995 | Croker | 95/114 |
| 6,345,614 | B1 | * | 2/2002 | Shureb | 123/572 |
| 6,460,525 | B1 | * | 10/2002 | Shureb | 123/572 |
| 6,475,256 | B2 | * | 11/2002 | Matsubara et al. | 55/337 |
| 6,475,382 | B2 | * | 11/2002 | Parent | 210/198.1 |
| 6,802,875 | B1 | * | 10/2004 | Kimbara et al. | 48/61 |
| 7,041,146 | B2 | * | 5/2006 | Bugli et al. | 55/481 |

FOREIGN PATENT DOCUMENTS

JP    2002-352844    12/2002

* cited by examiner

*Primary Examiner*—Walter D Griffin
*Assistant Examiner*—Amber Orlando
(74) *Attorney, Agent, or Firm*—Fish & Richardson P.C.

(57) ABSTRACT

A gas-liquid separator for a fuel cell system onboard a vehicle includes an upper chamber, a lower chamber, a plate for separating the upper and lower chambers, a pipe for circulating the exhaust gas and connecting holes bored in the plate. The upper chamber receives exhaust gas from the fuel cell system to separate water contained in the exhaust gas. The lower chamber has a portion for discharging the water which is separated by the upper chamber. The pipe, which is attached to the upper chamber, has fluid communication with an inside of the upper chamber. The connecting holes provide fluid communication between the upper and lower chambers. The connecting holes are positioned off a center of the plate so that the connecting holes lie apart from the pipe.

9 Claims, 7 Drawing Sheets

GAS-LIQUID SEPARATOR FOR A FUEL CELL SYSTEM ONBOARD A VEHICLE

BACKGROUND OF THE INVENTION

The present invention relates to a gas-liquid separator for a fuel cell system onboard a vehicle, which separates water contained in its exhaust gas.

Generally speaking, individual cells are bundled together to form a fuel cell stack, each of which has a cathode and anode separated by a proton conductive polymer electrolyte membrane (PEM). An individual cell generates electric power by electrochemical reaction between oxygen contained in air which is supplied to a cathode and hydrogen contained in fuel gas which is supplied to an anode. In this connection, a gas-liquid separator has been known which separates water in exhaust gas discharged by a fuel cell stack (See patent document 1). Because the water in the exhaust gas is separated by the gas-liquid separator, it is possible to prevent the water from staying in a line for circulating the exhaust gas. Therefore, the gas-liquid separator helps bring about smooth transportation of the exhaust gas in a downstream direction.

Patent document 1: Japanese Published Patent Application 2002-352844 (paragraphs 0023-0028 and FIG. 1)

A fuel cell vehicle, which is powered by electricity generated by a fuel cell system, has been drawing attention recently. It is desirable to adopt a gas-liquid separator for the fuel cell system onboard the vehicle, which is adapted to be low in height so as to be compatible with a space provided in the vehicle. As an example of this, a gas-liquid separator may be listed, in which pipes such as a pipe for circulating exhaust gas (inlet pipe and outlet pipe), a drain pipe and the like are attached to side walls of the separator.

When the fuel cell vehicle tilts, the gas-liquid separator tilts accordingly. As a result, water separated from the exhaust gas migrates in the gas-liquid separator, concentrating locally close to a side wall. In this way, it may be possible that the water flows into the pipe for circulating exhaust gas, causing an adverse effect of blockage.

SUMMARY OF THE INVENTION

The present invention seeks to provide a gas-liquid separator for a fuel cell system onboard a vehicle, which is able to prevent water separated from exhaust gas from flowing into a pipe for circulating exhaust gas when the vehicle tilts.

It is an aspect of the present invention to provide a gas-liquid separator for a fuel cell system onboard a vehicle, which comprises an upper chamber, a lower chamber, a plate for separating the upper and lower chambers, a pipe for circulating the exhaust gas and connecting holes bored in the plate. Description is given of each component as follows. The upper chamber receives exhaust gas from the fuel cell system to separate water contained in the exhaust gas. The lower chamber has a portion for discharging the water which is separated by the upper chamber. The pipe, which is attached to the upper chamber, has fluid communication with an inside of the upper chamber. The connecting holes provide fluid communication between the upper and lower chambers. The connecting holes are positioned off a center of the plate so that the connecting holes lie apart from the pipe.

In the gas-liquid separator described above, the water separated from the exhaust gas in the upper chamber enters to collect in the lower chamber via the connecting holes. The collected water is intermittently discharged from the lower chamber via the portion for discharging the water. The connecting holes bored in the plate for separating the upper and lower chambers is adapted to be positioned off the center of the plate so that the connecting holes lie apart from the pipe for circulating exhaust gas. As a result, it is possible for the plate to prevent the water accumulated in the lower chamber from migrating to the upper chamber, even if the upper and lower chambers tilt in a direction of the pipe for circulating exhaust gas. In this way, the gas-liquid separator described above is able to prevent the water accumulated in the lower chamber from flowing into the pipe for circulating exhaust gas, which is attached to the upper chamber.

It is another aspect of the present invention to provide a gas-liquid separator for a fuel cell system onboard a vehicle, in which the pipe is attached to a side wall of the upper chamber, and the connecting holes are positioned off the center of the plate toward an opposite side wall of the upper chamber.

It is still another aspect of the present invention to provide a gas-liquid separator for a fuel cell system onboard a vehicle, in which a bottom portion of the lower chamber comprises sloped surfaces so that the bottom portion is adapted to be concave, and the portion for discharging the water is positioned at a lowest portion of the bottom portion.

Because the bottom portion of the lower chamber is made of the sloped surfaces so as to be concave, the water separated from the exhaust gas in the upper chamber enters the lower chamber via the connecting holes, flowing along the sloped surfaces to the lowest portion of the bottom portion. In this way, the gas-liquid separator for a fuel cell system onboard a vehicle according to the present invention more efficiently collects the water in its bottom portion than a gas-liquid separator having a flat bottom does. And the portion for discharging the water is positioned in the lowest portion of the bottom portion, it is possible to steadily discharge the collected water.

DESCRIPTION OF THE PREFERRED EMBODIMENTS

Description is now given of an embodiment of a gas-liquid separator for a fuel cell system onboard a vehicle according to the present invention with reference to drawings. It should be noted that ribs for flow passage are not shown for convenience sake in FIG. 5.

Prior to explanation of a gas-liquid separator for a fuel cell system onboard a vehicle according to the present invention (hereinafter referred to as "gas-liquid separator"), description is given of a fuel cell system having the gas-liquid separator.

a. Fuel Cell System

Figure 1:
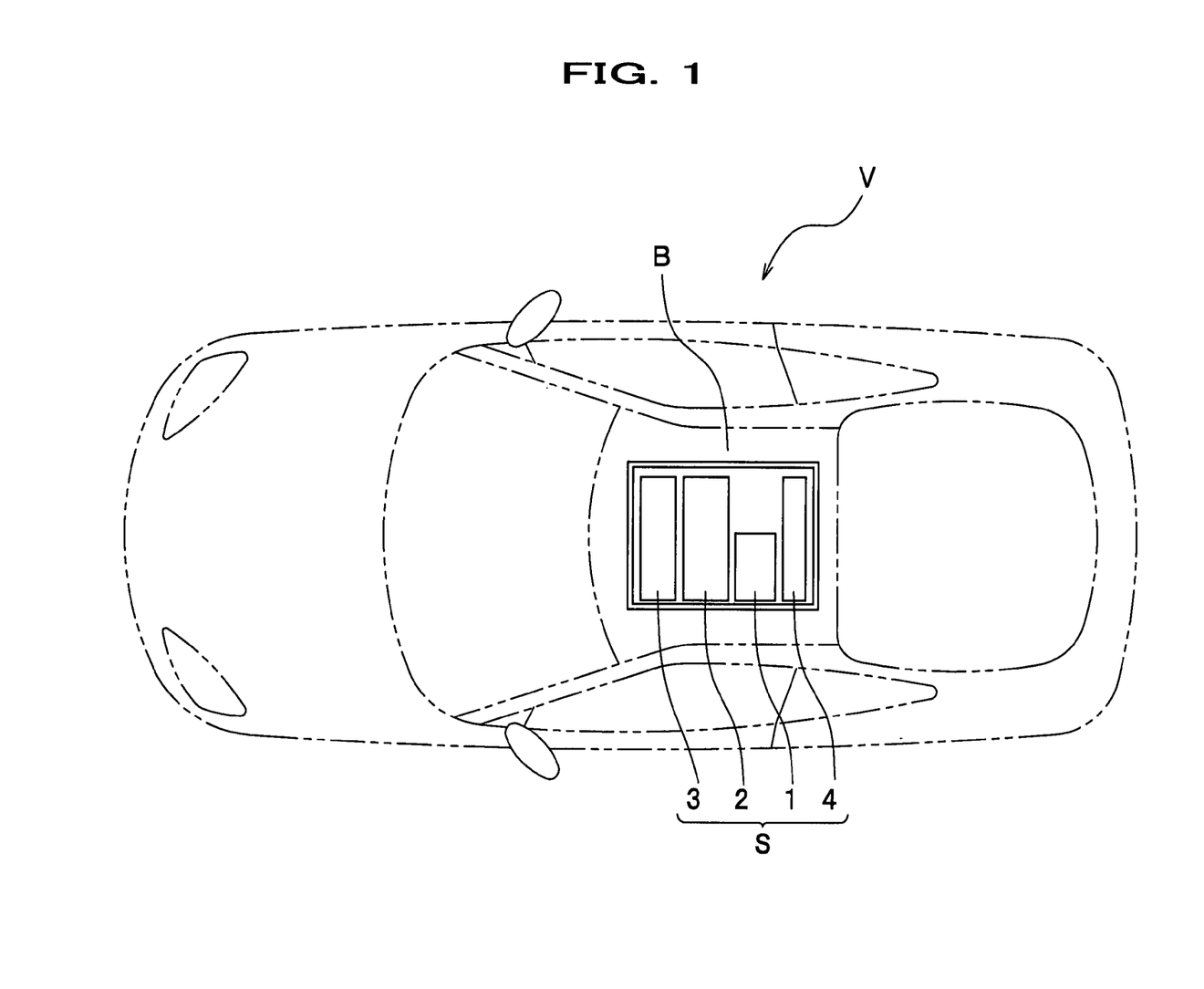
FIG. 1 is a plan view illustrating a vehicle having a fuel cell system to which a gas-liquid separator according to the present invention is applied.

As shown in FIG. 1, a fuel cell system S is installed in a fuel cell system box B, which is approximately disposed in the middle of a vehicle V under its floor. The fuel cell system S includes a fuel cell stack 2, a humidifier 3, a diluter 4 and a gas-liquid separator 1. The fuel cell system S further includes a high-pressure hydrogen tank 5, a compressor 6 (FIG. 2) and a radiator (not shown). The high-pressure hydrogen tank 5 supplies fuel (hydrogen) to the fuel cell stack 2. The compressor 6 supplies air (oxygen) to the fuel cell stack 2. The radiator cools the fuel cell stack 2.

Figure 2:
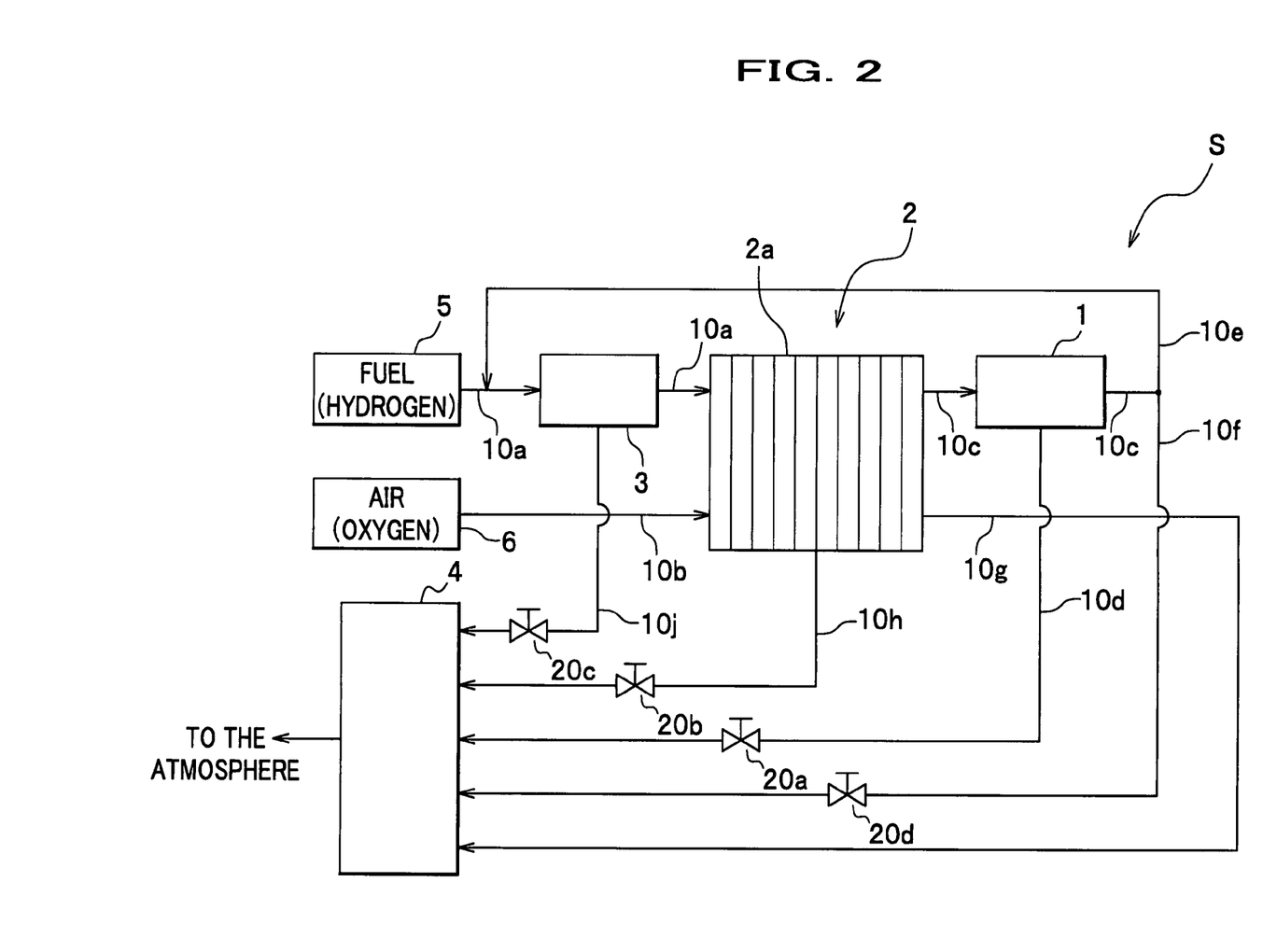
FIG. 2 is a block diagram showing a fuel cell system to which a gas-liquid separator according to the present invention is applied.

As shown in FIG. 2, the fuel cell stack 2, which is a stack of a plurality of individual cells 2a, generates power by electrochemical reaction between hydrogen as fuel stored in the high-pressure hydrogen tank 5 and oxygen contained in air supplied by the compressor 6. An anode-side inlet of the fuel cell stack 2 is connected with the high-pressure hydrogen tank 5 through a hydrogen supply line 10a. On the other hand, a cathode-side inlet of the fuel cell stack 2 is connected with the compressor 6 through an air supply line 10b. In this way, the hydrogen and air are supplied to the fuel cell stack 2 via the hydrogen supply line 10a and the air supply line 10b, respectively.

A hydrogen discharging line 10c is connected with an anode side outlet of the fuel cell stack 2 so as to discharge anode exhaust gas containing hydrogen which has not been used in power generation. A gas-liquid separator 1 to be described later is connected to the hydrogen discharging line 10c. The gas-liquid separator 1 separates water contained in the anode exhaust gas. One end of a drain line 10d is connected with the gas-liquid separator 1, and the other end with the diluter 4. A shut-off valve 20a is disposed in the drain line 10d. The shut-off valve 20a, which is adapted to be intermittently open, discharges the water separated by the gas-liquid separator 1 to the diluter 4.

A hydrogen circulating line 10e and a hydrogen purging line 10f branch from the hydrogen discharging line 10c at its end extending from the fuel cell stack 2. The hydrogen circulating line 10e, which is used for recycling hydrogen contained in the anode exhaust gas so that it is reused in generating power in the fuel cell stack 2, is connected with the hydrogen supply line 10a upstream the humidifier 3. The hydrogen purging line 10f purges impurities such as nitrogen and the like, which accumulate in the anode exhaust gas when the hydrogen contained in the anode exhaust gas is recycled via the hydrogen circulating line 10e. The hydrogen purging line 10f is connected with the diluter 4, and has a purge valve 20d. The purge valve 20d, which is adapted to be intermittently open, discharges anode exhaust gas in the hydrogen circulating line 10e along with the impurities to the diluter 4. In this connection, the anode exhaust gas discharged via the hydrogen purging line 10f is referred to as purging hydrogen hereinafter.

One end of an air discharging line 10g, which is for discharging cathode exhaust gas (air), is connected with a cathode-side outlet of the fuel cell stack 2. The other end is connected with the diluter 4.

One end of an anode drain line 10h, which is for discharging condensed water (drain) generated at an anode in power generation, is connected with the fuel cell stack 2. The other end is connected with the diluter 4. A shut-off valve 20b is provided in the anode drain line 10h so as to open and close a drain passage. The shut-off valve 20b, which is adapted to be intermittently open, discharges water generated in the fuel cell stack 2 to the diluter 4.

The humidifier 3, which is for humidifying hydrogen to be supplied to the fuel cell stack 2, is disposed somewhere in the hydrogen supply line 10a, which extends between the fuel cell stack 2 and the high-pressure hydrogen tank 5. One end of a humidifier drain line 10j, which is for discharging water (drain) accumulated in the humidifier 3, is connected with the humidifier 3. The other end is connected with the diluter 4. A shut-off valve 20c is provided in the humidifier drain line 10j so as to open and close its drain passage. The shut-off valve 20c, which is adapted to be intermittently open, discharges water accumulated in the humidifier 3 to the diluter 4.

The diluter 4 dilutes the purging hydrogen, which is discharged via the hydrogen purging line 10f, with the cathode exhaust gas (air) discharged via the air discharging line 10g, so that the diluter 4 discharges the diluted hydrogen into the atmosphere. As described above, the diluter 4 is adapted to receive the water (drain) from the humidifier 3, the water (drain) from the fuel cell stack 2 and the water from the gas-liquid separator 1. In this way, if these three types of water contain hydrogen, the diluter 4 will dilute the hydrogen with the cathode exhaust gas.

b. Gas-liquid Separator

Figure 3A:
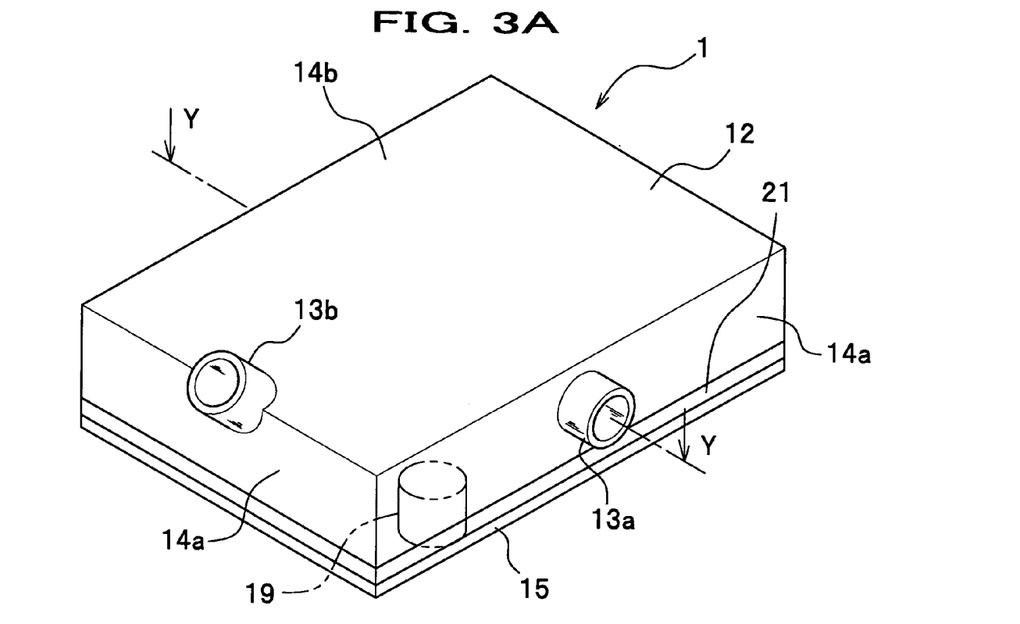
FIG. 3A is a perspective view showing a gas-liquid separator according to the present invention, as diagonally viewed from above.
Figure 3B:
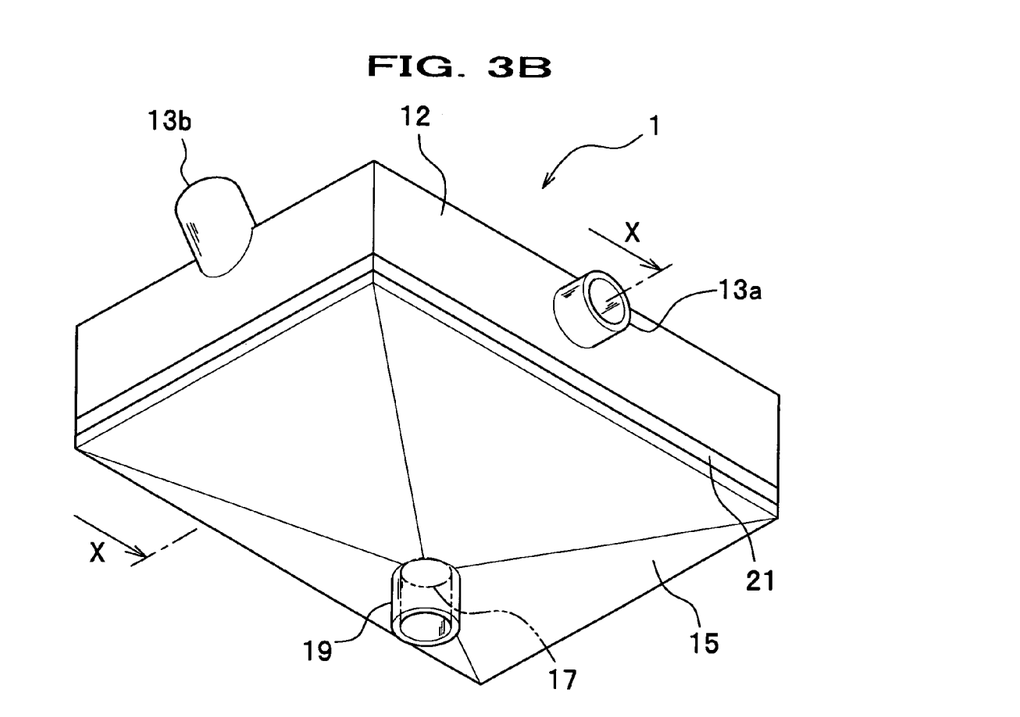
FIG. 3B is a perspective view showing a gas-liquid separator according to the present invention, as diagonally viewed from under.

As shown in FIGS. 3A and 3B, the gas-liquid separator 1 includes an upper chamber 12, a lower chamber 15 and a separating plate 21.

The upper chamber 12 is like a box having an external shape of a rectangular parallelepiped. The upper chamber 12, which the anode exhaust gas from the fuel cell stack 2 (FIG. 2) enters, separates water contained in the anode exhaust gas. The upper chamber 12 has an inlet pipe 13a for guiding the anode exhaust gas into it and an outlet pipe 13b for discharging the anode exhaust gas out of it. The inlet pipe 13a corresponds to "a pipe for circulating the exhaust gas" in the appended claims.

The inlet pipe 13a is connected with an upstream portion of the hydrogen discharging line 10c, which extends from the fuel cell stack 2. As shown in FIG. 2, this upstream portion is meant to represent a relative portion with respect to the gas-liquid separator 1. As shown in FIG. 3A, the inlet pipe 13a is attached to a side wall 14a of the upper chamber 12, projecting sideward from the upper chamber 12.

The outlet pipe 13b is connected with a downstream portion of the hydrogen discharging line 10c with respect to the gas-liquid separator 1 shown in FIG. 2. As shown in FIG. 3A, the outlet pipe 13b is attached to an edge formed by an upper wall 14b and the side wall 14a of the upper chamber 12, projecting from the upper chamber 12 in a diagonally upward direction.

Figure 4:
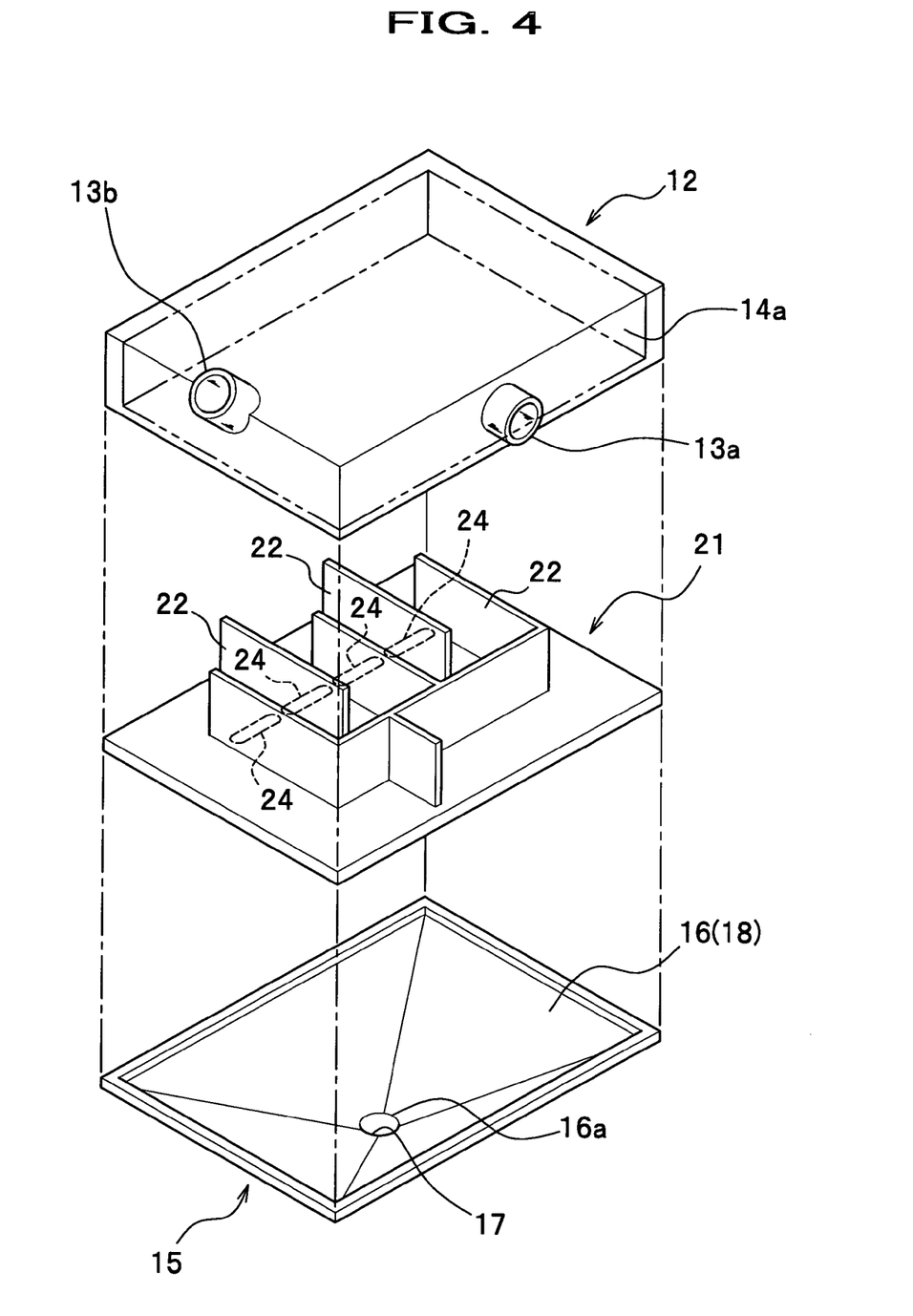
FIG. 4 is an exploded perspective view showing a gas-liquid separator according to the present invention.
Figure 5:
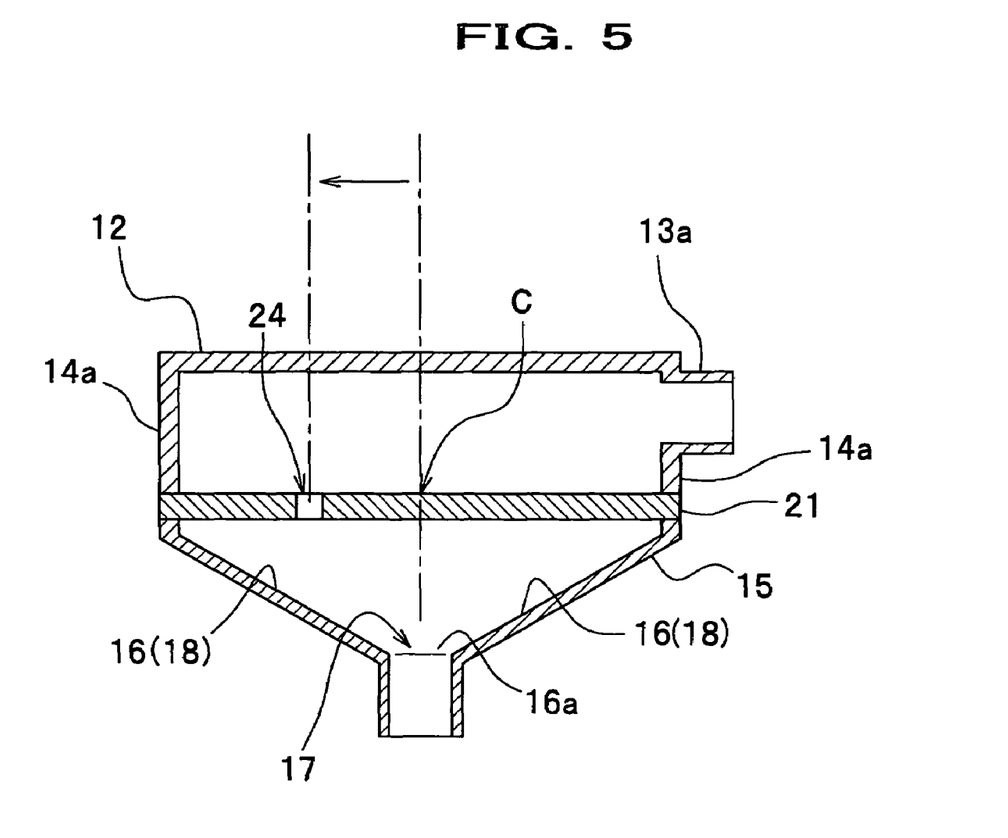
FIG. 5 is a sectional view taken along line X-X of FIG. 3B.

As shown in FIG. 3B, the lower chamber 15 has a shape similar to a four-sided polygonal pyramid, which is positioned so that its apex lies downward. The lower chamber 15 not only accumulates water in its bottom portion 16 (FIG. 5), which is separated from the anode exhaust gas in the upper chamber 12, but also intermittently discharges the accumulated water via a drain hole 17 (FIG. 5). As shown in FIG. 4, the bottom portion 16 inside the lower chamber 15 has a concave shape like a four-sided polygonal pyramid corresponding to its external shape. More specifically speaking, the bottom portion 16 is made of sloped surfaces 18 to form the concave shape.

As shown in FIGS. 4 and 5, the drain hole 17, which is for discharging the water accumulated in the lower chamber 15, is bored in a lowest portion 16a of the bottom portion 16. This drain hole 17 corresponds to "a portion for discharging the water" in the appended claims. As shown in FIG. 3B, a drain pipe 19 is connected with the drain hole 17. The drain pipe 19, with which the drain line 10d shown in FIG. 2 is connected, projects downward from the lower chamber 15.

As shown in FIG. 4, the separating plate 21 is a member like a rectangular plate, on which ribs 22 for forming fluid passage are disposed upright. The separating plate 21 is sandwiched between the upper chamber 12 and the lower chamber 15 so as to separate them.

Figure 6:
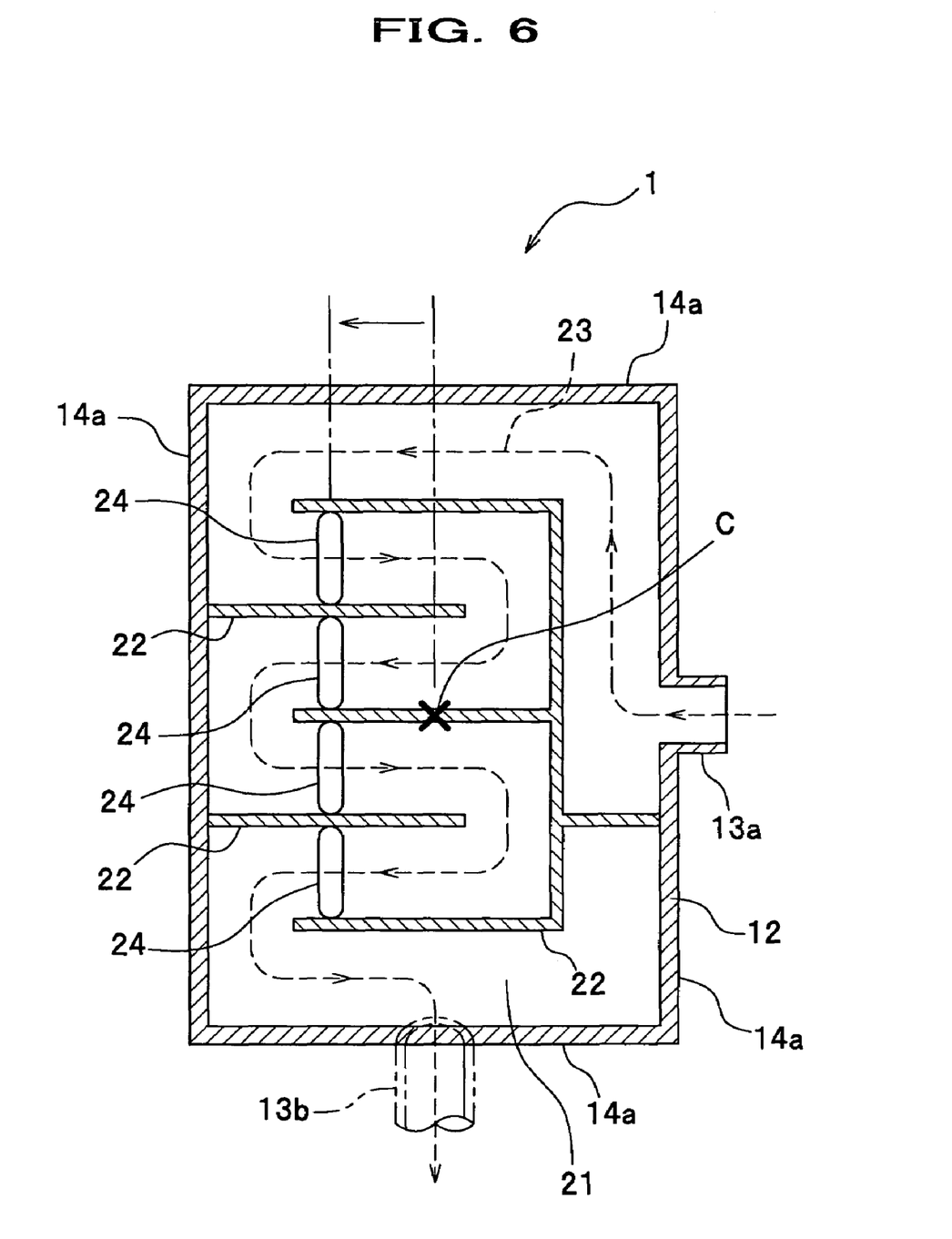
FIG. 6 is a sectional view taken along line Y-Y of FIG. 3A.

As shown in FIG. 6, the ribs 22 are to form a serpentine fluid passage 23 through which exhaust gas guided into the upper chamber 12 travels. The ribs 22, which partition the upper chamber 12, form the fluid passage 23, which extends from the inlet pipe 13a to the outlet pipe 13b for exhaust gas.

As shown in FIG. 4, the separating plate 21 has a plurality of connecting holes 24, which makes the upper chamber 12 fluidly communicate with the lower chamber 15. A connecting hole 24 guides the water separated from the anode exhaust gas in the upper chamber 12 into the lower chamber 15. And as shown in FIGS. 5 and 6, the connecting holes 24 are positioned off a center C of the separating plate 21 in a direction of an opposite side of the side wall 14a with respect to the inlet pipe 13a. In other words, the connecting holes 24 are positioned off the center C of the separating plate 21 so as to lie away from the inlet pipe 13a.

Figure 7A:
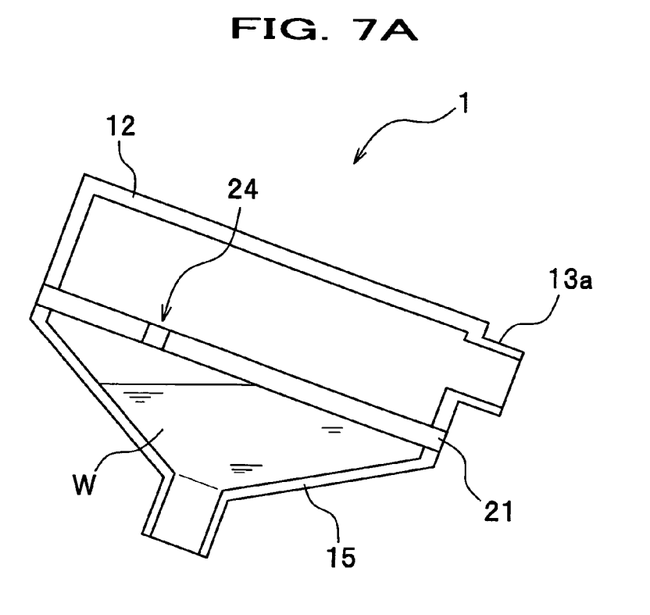
FIGS. 7A and 7B are schematic diagrams illustrating a gas-liquid separator when tilted.
Figure 7B:
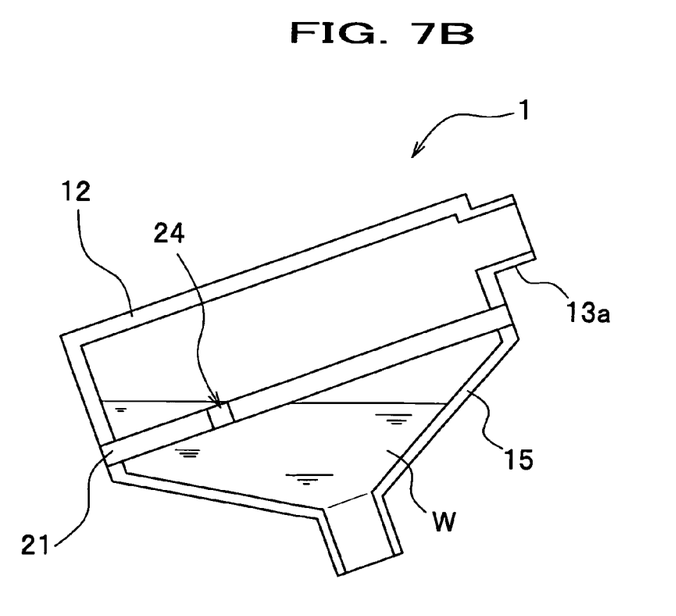

Next, description is given of operation of a gas-liquid separator according to the embodiment. FIGS. 7A and 7B are schematic diagrams illustrating tilted upper and lower chambers. It should be noted that ribs for forming fluid passage are not shown for convenience sake.

As shown in FIG. 2, anode exhaust gas containing water is introduced into a gas-liquid separator 1 from a fuel cell stack 2 via a hydrogen discharging line 10c. As shown in FIG. 6, this anode exhaust gas enters an upper chamber 12 via an inlet pipe 13a, which is connected with the hydrogen discharging line 10c (FIG. 2). The anode exhaust gas flows from the inlet pipe 13a to an outlet pipe 13b in the upper chamber 12, traveling along a serpentine fluid passage 23 partitioned by ribs 22 for forming fluid passage. While the anode exhaust gas is traveling in the upper chamber 12, it experiences separation of water droplets caused by their collision against the ribs 22 and internal surfaces of a side wall 14a and an upper wall 14b (FIG. 3A) of the upper chamber 12. Water vapors contained in the anode exhaust gas lose their latent heat to condense, which is absorbed by the upper chamber 12 and a separating plate 21, so that they are separated from the anode exhaust gas.

The water separated in the upper chamber 12 moves into a lower chamber 15 via connecting holes 24 shown in FIG. 5. When a shut-off valve 20a shown in FIG. 2 is closed, the water accumulates in a bottom portion 16 of the lower chamber 15 shown in FIG. 5.

As the gas-liquid separator 1 has the lower chamber 15, whose bottom portion 16 has a concave shape formed by sloped surfaces 18, the water travels along the sloped surfaces 18, efficiently collecting in a lowest portion 16a of the bottom portion 16.

As shown in FIG. 7A, when the upper and lower chambers 12 and 15 are tilted in a direction of the inlet pipe 13a, the separating plate 21 prevents water W accumulated in the lower chamber 15 from moving into the upper chamber 12. In this way, the gas-liquid separator 1 is able to prevent the water W accumulated in the lower chamber 15 from flowing into the inlet pipe 13a attached to the upper chamber 12.

In contrast as shown in FIG. 7B, when the upper and lower chambers 12 and 15 are tilted in an opposite direction, it may not be possible for the water W to flow into the inlet pipe 13a.

When the shut-off valve 20a shown in FIG. 2 intermittently opens, the water W accumulated in the lower chamber 15 (FIGS. 7A and 7B) is discharged into a diluter 4 (FIG. 2), via a drain hole 17, a drain pipe 19 and a discharging line 10d (FIG. 2), which is connected with the drain pipe 19. Subsequently, the water W discharged into the diluter 4 is released into the atmosphere, along with purging hydrogen traveling via a hydrogen purging line 10f, cathode exhaust gas (air) via an air discharging line 10g, water (drain) via a humidifier drain line 10j and water (drain) via an anode drain line 10h, which are shown in FIG. 2.

The gas-liquid separator 1 described above is able to mitigate a risk that the water accumulated in the lower chamber 15 flows into the inlet pipe 13a, when a vehicle V tilts. As a result, a fuel cell system S having the gas-liquid separator 1 is able to provide smooth supply of anode exhaust gas (recycling of anode exhaust gas) to the fuel cell stack 2 via a hydrogen circulating line 10e.

It will now be appreciated from the foregoing description that the present invention is not limited to the particularly illustrated embodiment discussed above and may be carried out in various modified forms. In the embodiment described above, the gas-liquid separator 1 has the inlet pipe 13a which is attached to the side wall 14a of the upper chamber 12, and the outlet pipe 13b attached to the upper wall 14b, but the present invention is not limited to this configuration. For example, it may be alternatively possible to attach both inlet pipe 13a and outlet pipe 13b to the side wall 14a. It may also be alternatively possible to attach the inlet pipe 13a to the upper wall 14b and the outlet pipe 13b to the side wall 14a, in which case the outlet pipe 13b corresponds to "a pipe for circulating exhaust gas" in the appended claims. In other words, the gas-liquid separator according to the present invention requires that at least one of the inlet pipe 13a and the outlet pipe 13b be attached to the side wall 14a of the upper chamber 12. In this connection, a gas-liquid separator 1, which has both inlet pipe 13a and outlet pipe 13b attached to a side wall 14a, is able to decrease its dimension in height.

Although the embodiment described above has the drain hole 17 (a portion for discharging the water) in the lowest portion 16a of bottom portion 16 of lower chamber 15, the present invention is not limited to this. It may be alternatively possible to position a drain hole 17 proximity to an opposite side of a side wall 14a with respect to an inlet pipe 13a in a bottom portion 16.

The embodiment described above has the bottom portion 16 of lower chamber 15 which is like a four-sided polygonal pyramid, but the present invention is not limited to this shape. It may be alternatively possible to adopt a bottom portion shaped like a cone. It may also be possible for the upper and lower chambers 12 and 15 to have an external shape of a cylinder or an elliptic cylinder. It may further be possible that at least one of the upper and lower chambers 12 and 15 has a shape like a bowl.

Although the gas-liquid separator 1 is exemplarily connected with the hydrogen discharging line 10c in the embodiment described above, the present invention is not limited to this configuration. It may be alternatively possible to connect a gas-liquid separator 1 with one of a hydrogen circulating line 10e and an air discharging line 10g.

Although one end of the drain line 10d for discharging water from the gas-liquid separator 1 is exemplarily connected with the diluter 4 in the embodiment described above, the present invention is not limited to this configuration. It may be alternatively possible to connect a drain line 10d with a humidifier 3. A gas-liquid separator 1 configured like this is able to supply water so as to humidify fuel (hydrogen).

The humidifier 3 is only connected with the hydrogen supply line 10a in the embodiment described above, but the present invention is not limited to this configuration. It may be alternatively possible that a humidifier 3 is only connected with an air supply line 10b, or the humidifier 3 is connected with both hydrogen supply line 10a and air supply line 10b.

Foreign priority document, JP 2004-308063 filed on Oct. 22, 2004 is hereby incorporated by reference.

What is claimed is:

1. A gas-liquid separator for a fuel cell system onboard a vehicle comprising:
    an upper chamber for receiving exhaust gas from the fuel cell system to separate water contained in the exhaust gas;
    a lower chamber having a portion for discharging the water which is separated by the upper chamber;
    a plate for separating the upper and lower chambers;
    an inlet pipe for circulating the exhaust gas, the inlet pipe, which is attached to the upper chamber, having fluid communication with an inside of the upper chamber; and
    connecting holes bored in the plate, the connecting holes providing fluid communication between the upper and lower chambers;
    wherein the connecting holes are positioned exclusively off a center of the plate and exclusively between the center of the plate and a side wall of the gas-liquid separator opposite the inlet pipe, and the plate has ribs on an upper chamber side for forming, as a whole, a serpentine fluid passage for the exhaust gas in the upper chamber,
    wherein each of the connecting holes is positioned between two adjacent ribs forming the serpentine fluid passage, and
    wherein portions of the ribs are arranged to prevent liquid from flowing under gravity from the connecting holes to the inlet pipe when the gas liquid separator is tilted toward the inlet pipe.

2. The gas-liquid separator for a fuel cell system onboard a vehicle according to claim 1, wherein the inlet pipe is attached to a side wall of the upper chamber, and the connecting holes are positioned off the center of the plate toward an opposite side wall of the upper chamber.

3. The gas-liquid separator for a fuel cell system onboard a vehicle according to claim 1, wherein a bottom portion of the lower chamber comprises sloped surfaces so that the bottom portion is adapted to be concave, and the portion for discharging the water is positioned at a lowest portion of the bottom portion.

4. The gas-liquid separator for a fuel cell system onboard a vehicle according to claim 3, wherein the bottom portion is shaped like a polygonal pyramid.

5. The gas-liquid separator for a fuel cell system onboard a vehicle according to claim 3, wherein the bottom portion is shaped like a cone.

6. The gas-liquid separator for a fuel cell system onboard a vehicle according to claim 3, wherein the bottom portion is shaped like an elliptic cone.

7. The gas-liquid separator for a fuel cell system onboard a vehicle according to claim 1, wherein an outlet pipe for the exhaust gas is attached to the upper chamber, which projects therefrom in a diagonally upward direction, and wherein the serpentine fluid passage is between the inlet pipe and the outlet pipe of the separator.

8. The gas-liquid separator of claim 1, wherein portions of the ribs are arranged between the connecting holes and the inlet pipe to prevent water in portions of the serpentine fluid passage that correspond to the connecting holes from flowing to the inlet pipe.

9. A gas-liquid separator for a fuel cell system onboard a vehicle comprising:
    an upper chamber for receiving exhaust gas from the fuel cell system to separate water contained in the exhaust gas;
    a lower chamber having a portion for discharging the water which is separated by the upper chamber;
    a plate for separating the upper and lower chambers;
    an inlet pipe for circulating the exhaust gas, the inlet pipe being attached to a side wall of the gas-liquid separator and having fluid communication with an inside of the upper chamber; and
    connecting holes bored in the plate, the connecting holes providing fluid communication between the upper chamber and lower chamber;
    wherein the connecting holes are positioned exclusively off a center of the plate and exclusively between the center of the plate and a side wall of the gas-liquid separator opposite the inlet pipe, and the plate has ribs on an upper chamber side for forming, as a whole, a serpentine fluid passage for the exhaust gas in the upper chamber,
    wherein each of the connecting holes is positioned between two adjacent ribs forming the serpentine fluid passage, and
    wherein portions of the ribs are arranged to prevent liquid from flowing under gravity from the connecting holes to the inlet pipe when the gas liquid separator is tilted toward the inlet pipe.

* * * * *